United States Patent
Elliott

(10) Patent No.: US 11,395,996 B2
(45) Date of Patent: Jul. 26, 2022

(54) IMMERSION MIXER WITH TRIGGER MANIPULABLE FROM MULTIPLE GRASPING LOCATIONS

(71) Applicant: Hamilton Beach Brands, Inc., Glen Allen, VA (US)

(72) Inventor: Joseph R Elliott, Henrico, VA (US)

(73) Assignee: Hamilton Beach Brands, Inc., Glen Allen, VA (US)

(*) Notice: Subject to any disclaimer, the term of this patent is extended or adjusted under 35 U.S.C. 154(b) by 811 days.

(21) Appl. No.: 16/100,955

(22) Filed: Aug. 10, 2018

(65) Prior Publication Data

US 2020/0047139 A1  Feb. 13, 2020

(51) Int. Cl.
| | | |
|---|---|---|
| *B01F 13/00* | (2006.01) | |
| *B01F 7/00* | (2006.01) | |
| *B01F 13/04* | (2006.01) | |
| *B01F 15/00* | (2006.01) | |
| *A47J 43/044* | (2006.01) | |
| *B01F 33/501* | (2022.01) | |
| *B01F 27/25* | (2022.01) | |
| *B01F 35/32* | (2022.01) | |
| *B01F 35/60* | (2022.01) | |
| *B01F 101/00* | (2022.01) | |

(52) U.S. Cl.
CPC ......... *B01F 33/5011* (2022.01); *A47J 43/044* (2013.01); *B01F 27/25* (2022.01); *B01F 35/3204* (2022.01); *B01F 35/6052* (2022.01); *A47J 2043/04409* (2013.01); *B01F 2101/1805* (2022.01)

(58) Field of Classification Search
CPC ...... A47J 2043/04409; A47J 2043/0744; A47J 43/0711; A47J 43/0705; A47J 43/044; B01F 13/002; B01F 33/5011
USPC .......................................................... 366/129
See application file for complete search history.

(56) References Cited

U.S. PATENT DOCUMENTS

| | | | | |
|---|---|---|---|---|
| 5,368,384 | A * | 11/1994 | Duncan ................. | A47J 43/044 219/227 |
| 6,079,865 | A * | 6/2000 | Plavcan ................ | A47J 43/044 200/16 R |
| 6,974,244 | B1 * | 12/2005 | Lin ...................... | A47J 43/0705 366/129 |
| 9,190,822 | B2 * | 11/2015 | McCormick ........... | H02G 11/00 |
| 2005/0122836 | A1 * | 6/2005 | Boyle ................... | B01F 7/1605 366/197 |
| 2014/0247688 | A1 * | 9/2014 | Conti .................... | A47J 43/044 366/343 |

(Continued)

*Primary Examiner* — Elizabeth Insler
(74) *Attorney, Agent, or Firm* — Alexander D. Raring

(57) ABSTRACT

An immersion mixer includes: a housing; a drive motor residing within the housing; a shaft attached to the motor and configured to rotate relative to the housing; blades attached to and rotatable with the shaft; a handle attached to the housing, the handle including a first segment and a second segment attached to the first segment and to the housing; and a trigger attached to the handle and operatively associated with the motor. The trigger includes a first segment that is generally parallel with the first segment of the handle and a second segment that is generally parallel with the second segment of the handle. Engagement by a user of either the first segment of the trigger or the second segment of the trigger causes the drive motor to rotate the shaft and blades.

15 Claims, 11 Drawing Sheets

(56) References Cited

U.S. PATENT DOCUMENTS

2016/0235250 A1\* 8/2016 Bournay, Jr. ......... A47J 43/044

\* cited by examiner

IMMERSION MIXER WITH TRIGGER MANIPULABLE FROM MULTIPLE GRASPING LOCATIONS

FIELD OF THE INVENTION

The present invention is directed generally to food processing, and more specifically to immersion mixers.

BACKGROUND

An immersion mixer (also known a stick mixer or wand mixer) is a kitchen blade grinder used to blend ingredients or purée food in a container in which they are being prepared. Typical uses include puréeing soups and emulsifying sauces.

A stick mixer comprises an electric motor that drives rotating cutting blades at the end of a shaft. The shaft and blades are immersed in the food being blended. The drive motor resides inside a housing which can be held by hand, typically via an attached handle. Some immersion mixers can be used while a pan, pot or the like is on a stove or other cooking surface. Immersion mixers can be distinguished from worktop mixers and food processors, which typically require food to be placed in a specific vessel for processing.

Immersion mixers, and in particular commercial-sized immersion mixers, are subject to a number of regulations promulgated by regulatory agencies, such as Underwriter's Laboratory (UL), International Electrotechnical Commission (IEC), and the National Sanitation Foundation (NSF). For example, UL regulations require that an immersion mixer include (a) a power switch that energizes the mixer and (b) a trigger that engages the motor and the blades along with (c) an interlock switch that must be engaged initially for the trigger to activate the blades. The required interplay between the trigger and the interlock switch ensures that the unit will not unintentionally start.

Given the different safety regulations that cover immersion mixers, it may be desirable to provide different configurations that facilitate use while still satisfying the pertinent regulations.

SUMMARY

As a first aspect, embodiments of the invention are directed to an immersion mixer comprising: a housing; a drive motor residing within the housing; a shaft attached to the motor and configured to rotate relative to the housing; blades attached to and rotatable with the shaft; a handle attached to the housing, the handle including a first segment and a second segment attached to the first segment and to the housing; and a trigger attached to the handle and operatively associated with the motor. The trigger includes a first segment that is generally parallel with the first segment of the handle and a second segment that is generally parallel with the second segment of the handle. Engagement by a user of either the first segment of the trigger or the second segment of the trigger causes the drive motor to rotate the shaft and blades.

As a second aspect, embodiments of the invention are directed to an immersion mixer comprising: a housing; a drive motor residing within the housing; a shaft attached to the motor and configured to rotate relative to the housing; blades attached to and rotatable with the shaft; a handle attached to the housing, the handle including a first segment and a second segment attached to the first segment and to the housing; and a trigger attached to the handle and operatively associated with the motor. Engagement by a user of the trigger causes the drive motor to rotate the shaft and blades. The mixer further comprises a drive speed dial mounted to the handle adjacent the trigger for rotation about an axis that is generally normal to the first and second segments of the handle. The drive speed dial is operatively associated with the motor and configured such that rotation of the dial adjusts the rotational speed of the blades.

As a third aspect, embodiments of the invention are directed to an immersion mixer comprising: a housing; a drive motor residing within the housing; a shaft attached to the motor and configured to rotate relative to the housing; blades attached to and rotatable with the shaft; a handle attached to the housing, the handle including a detachable cover; a trigger attached to the handle and operatively associated with the motor; and a power cord electrically connected with the motor, the power cord mounted on the cover of the handle.

DETAILED DESCRIPTION

Figure 1:
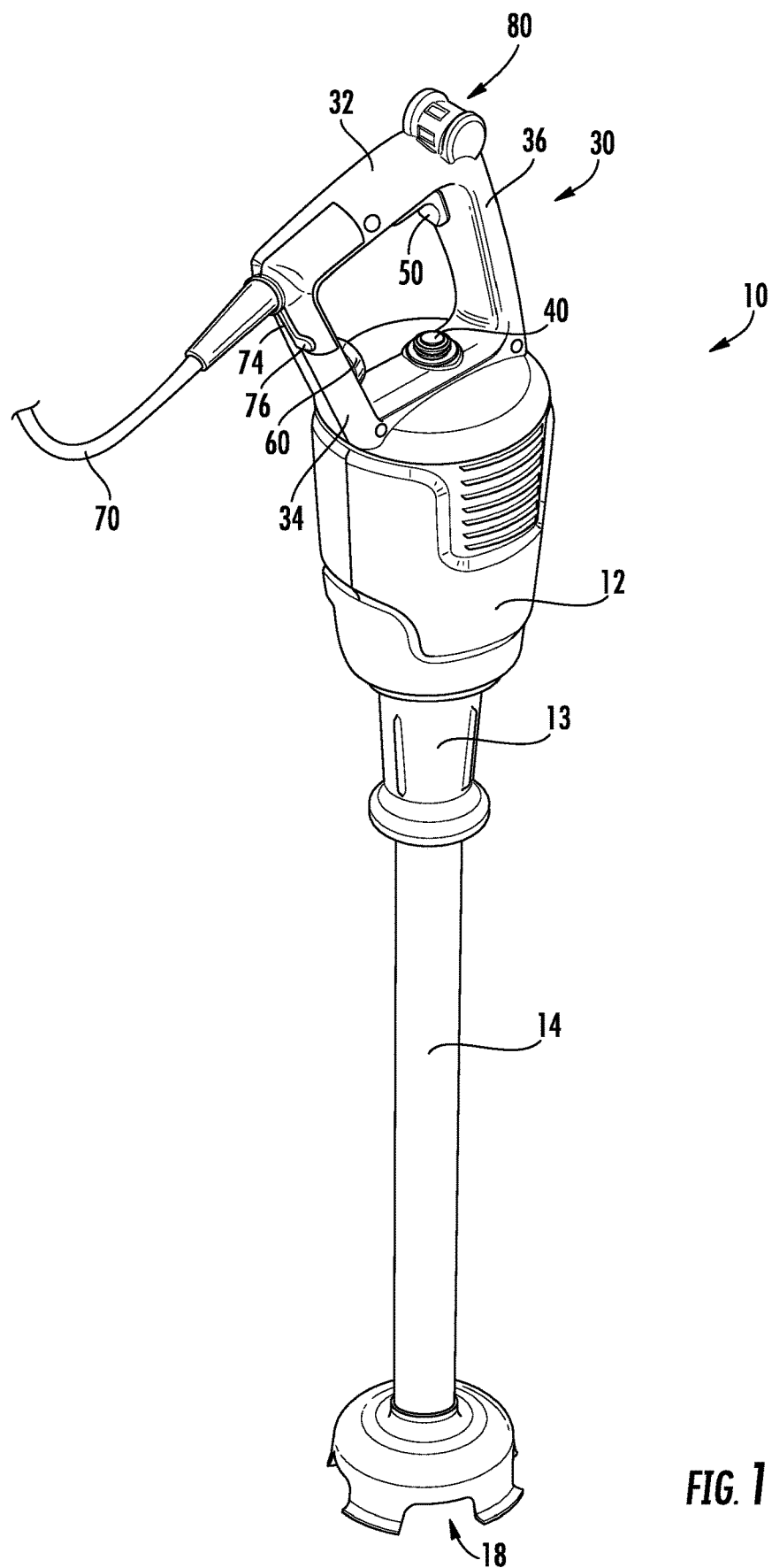
FIG. 1 is a perspective view of an immersion mixer according to embodiments of the invention.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figure 2:
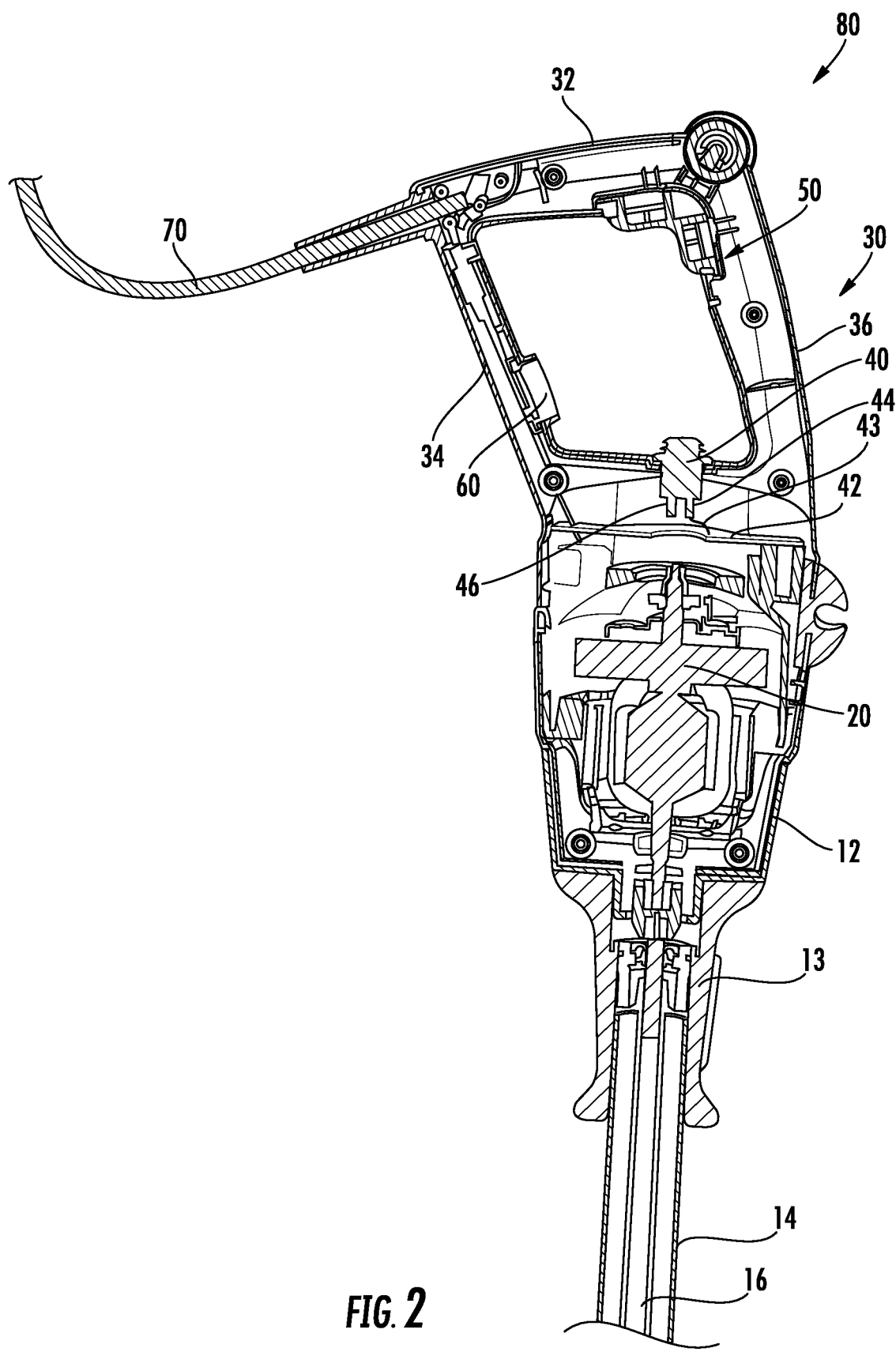
FIG. 2 is a side section view of the housing and handle of the immersion mixer of FIG. 1.

Referring now to the drawings, an immersion mixer, designated broadly at 10, is shown in FIGS. 1 and 2. The mixer 10 includes a housing 12, a grip 13 attached to the lower end thereof, a shaft sleeve 14 that extends from the lower end of the grip 13, a shaft 16 housed within the shaft sleeve 14, and blades 18 mounted at the end of the shaft 16. A drive motor 20 is located within the housing 12 and is connected with the shaft 16 to rotate the shaft 16, and in turn the blades 18, to process (e.g., chop, dice, mix, blend, etc.) food. The construction of the motor 20, shaft sleeve 14, shaft 16 and blades 18 may be conventional and need not be described in detail herein. Exemplary immersion mixers are discussed in U.S. Pat. No. 6,974,244 to Lin and U.S. Pat. No. 8,033,712 to Calange, the disclosures of which are hereby incorporated herein by reference in full.

Figure 3:
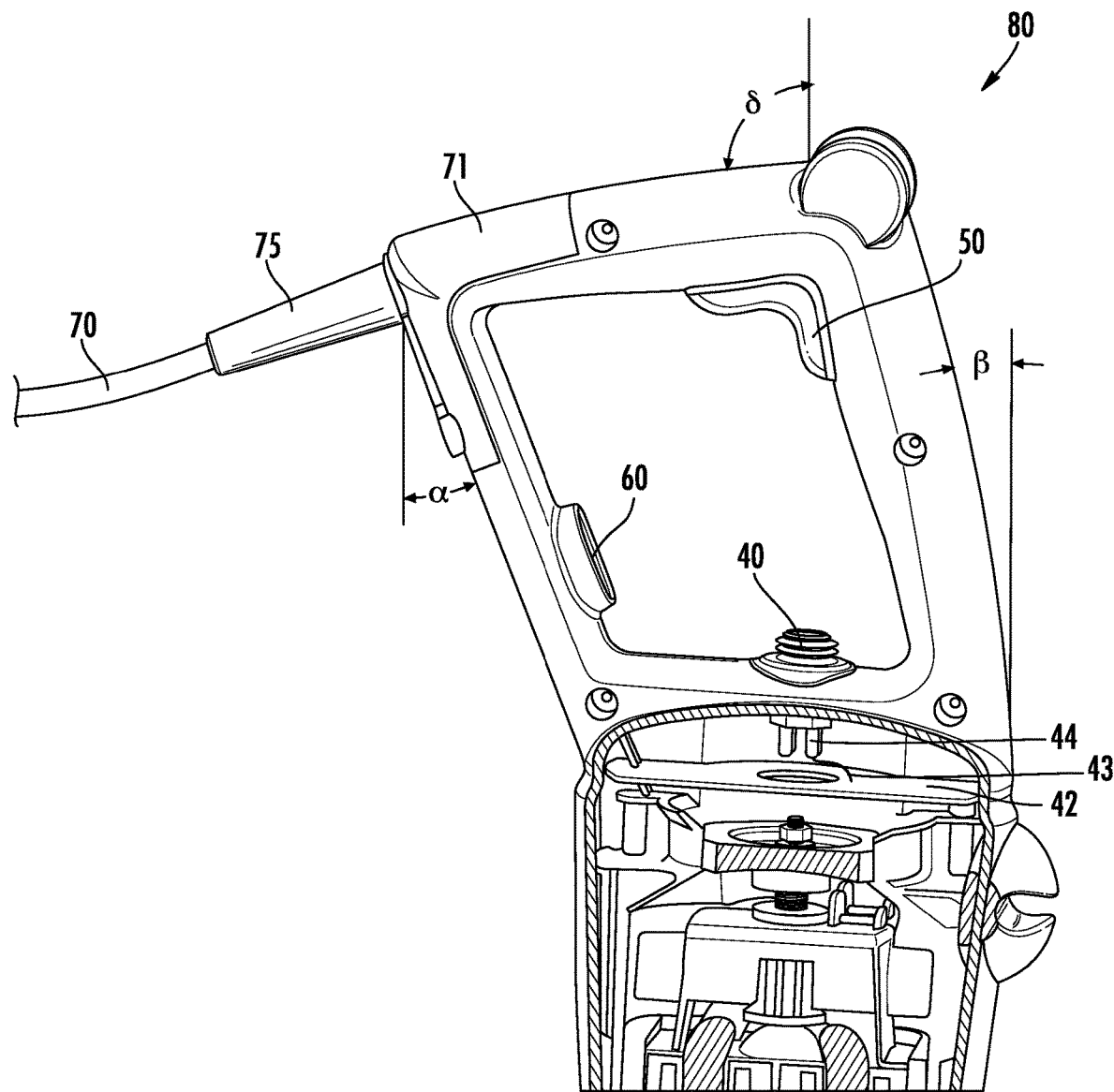
FIG. 3 is an enlarged side view of the housing and handle of FIG. 2 showing the full handle and a section view of the housing.

Referring now to FIG. 3, a handle 30 extends upwardly from the housing 12. The handle 30 is generally U-shaped, with a rear segment 34, a front segment 36, and a horizontal segment 32 that spans the upper ends of the rear and front segments 34, 36. As can be seen in FIG. 3, the rear segment 34 is canted slightly at an acute angle α relative to the shaft 16 (typically between about 1 and 45 degrees), such that the upper end of the rear segment 34 is slightly rearward of the housing 12. The front segment 36 is also canted rearwardly relative to the shaft 16 at an angle β (typically between about 1 and 45 degrees). The horizontal segment 32 is not perpendicular to the upper surface of the housing, 12, but instead rises slightly in extending from the rear segment 34 to the front segment 36, forming an angle δ with the shaft 16 (typically between about 45 and 90 degrees).

Figure 11:
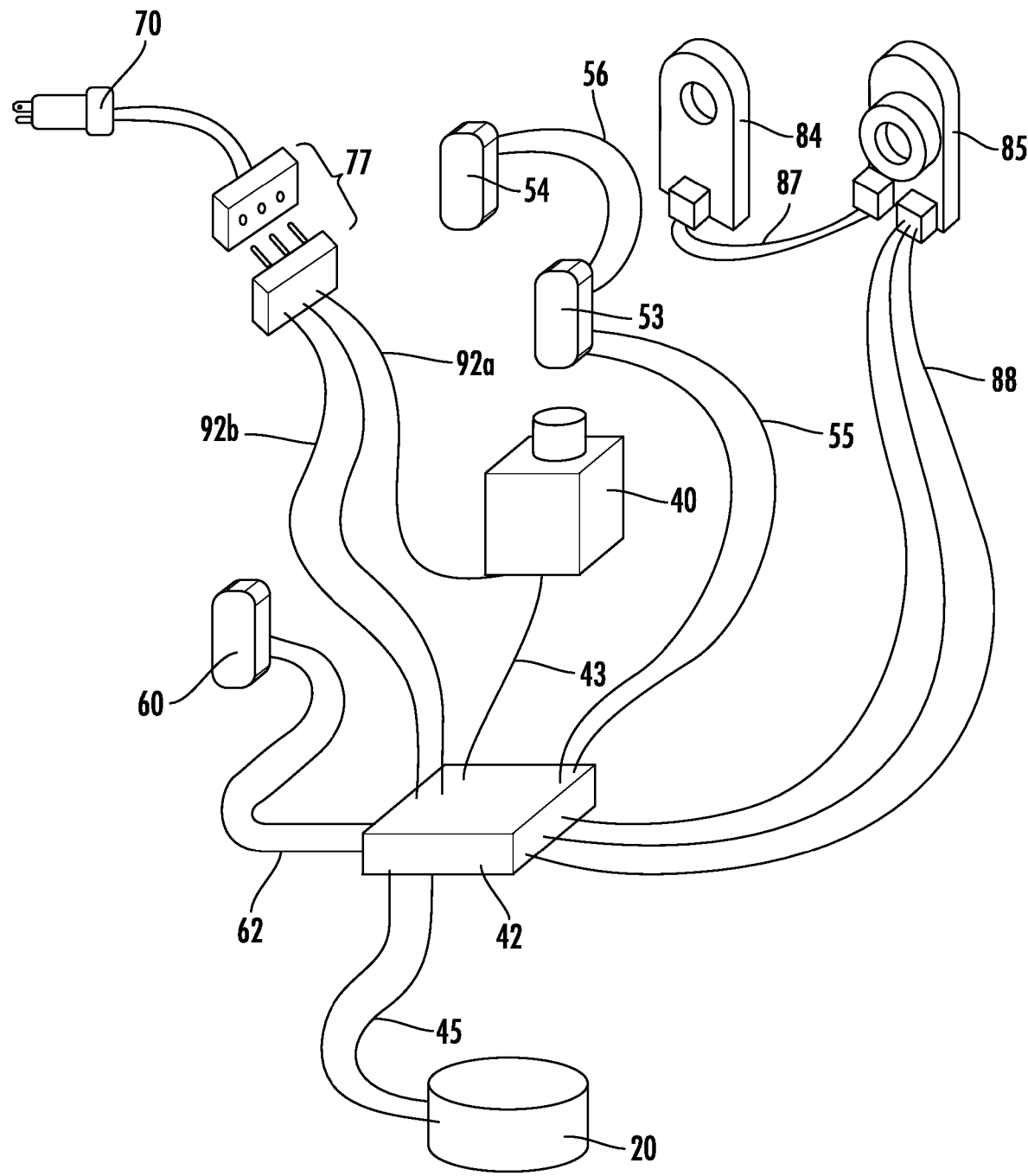
FIG. 11 is a schematic illustration of the electrical wiring arrangement of the mixer of FIG. 1.

Still referring to FIG. 3, a power button or switch 40 is mounted on the upper surface 38 of the housing 12. The power button 40, which may be of conventional construction, is electrically connected a printed circuit board 42 within the housing 12 via wiring 43 that extends from a terminal 44 of the power button 40. The motor 20 is also electrically connected to the PCB 42 via wiring 45 (see FIG. 11).

An L-shaped activation trigger 50 is mounted to the upper forward portion of the handle 30. More specifically, a vertical leg 51 of the trigger 50 is positioned behind the upper end of the forward segment 36, and a horizontal leg 52 of the trigger 50 is positioned underneath the forward end of the horizontal segment 32. A first capacitive switch 53 is mounted forwardly of the vertical leg 51 of the trigger 50, and a second capacitive switch 54 is mounted above the horizontal leg 52 of the trigger 50. The capacitive switches 53, 54 are electrically connected with the PCB 42 via wiring 55, 56 (see FIG. 11). The capacitive switches 53, 54 are sufficiently sensitive that gentle pressure applied by a user's fingers to either the vertical leg 51 or the horizontal leg 52 of the trigger 50 can activate the corresponding switch 53, 54.

An interlock button 60 is mounted to the forward surface of the rear segment 34. A capacitive switch 61 is mounted rearward of the interlock button 60 and is electrically connected with the PCB 42 via wiring 62.

Figure 8:
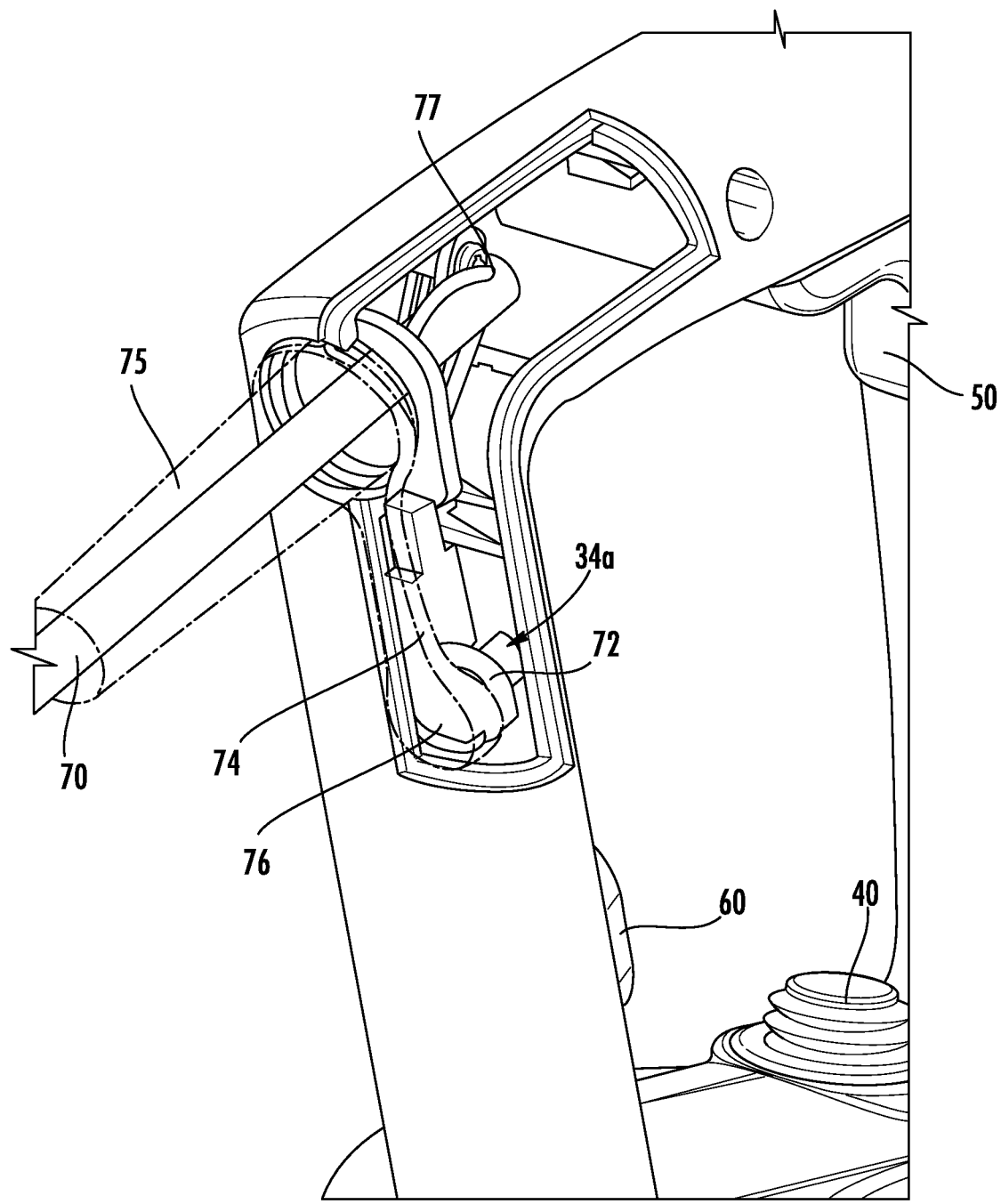
FIG. 8 is a greatly enlarged perspective section view of the handle and power cord of the mixer of FIG. 1.
Figure 9:
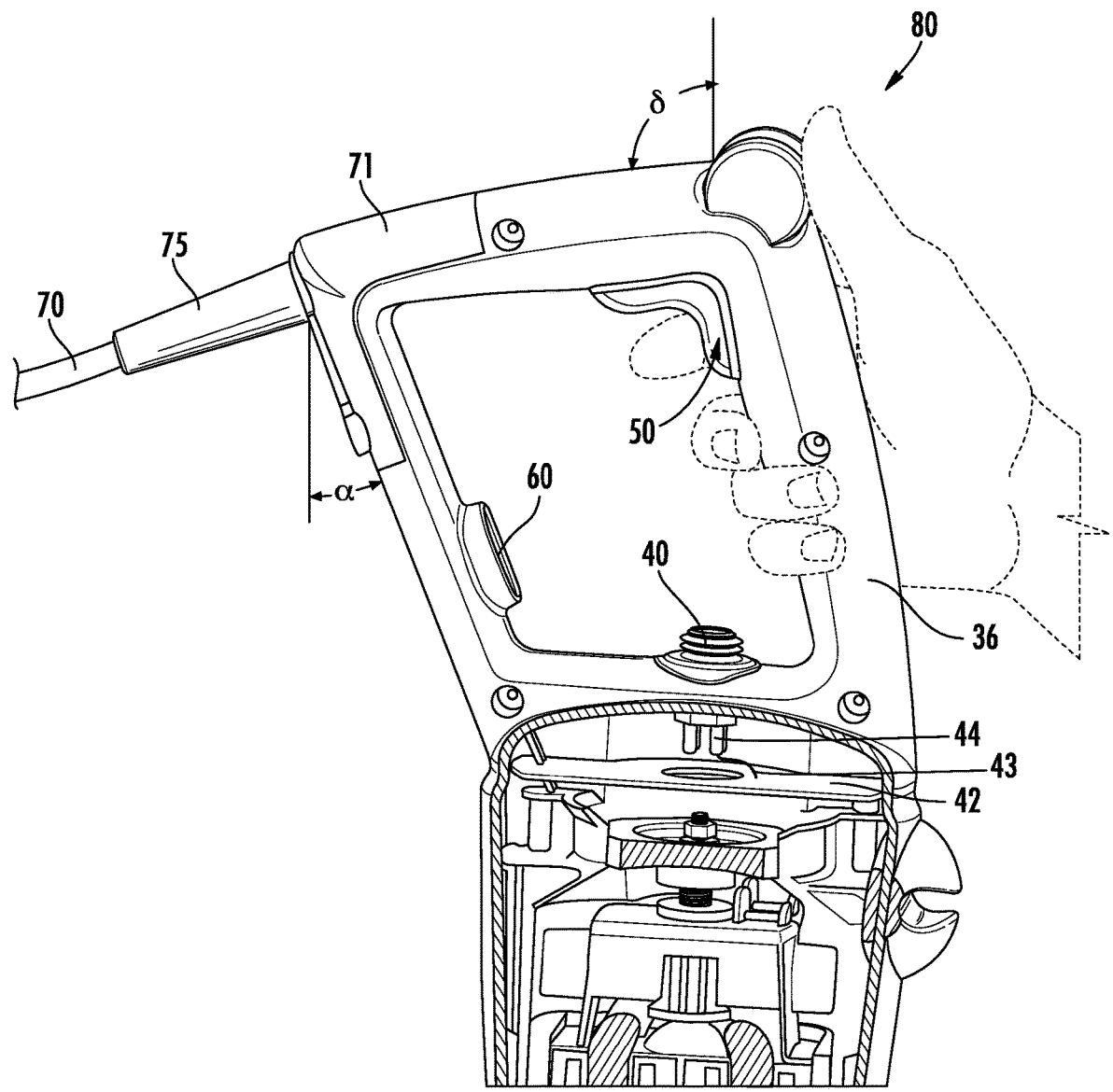
FIG. 9 is a side partial section view of the mixer of FIG. 1 with a user's hand grasping the front segment of the handle.
Figure 10:
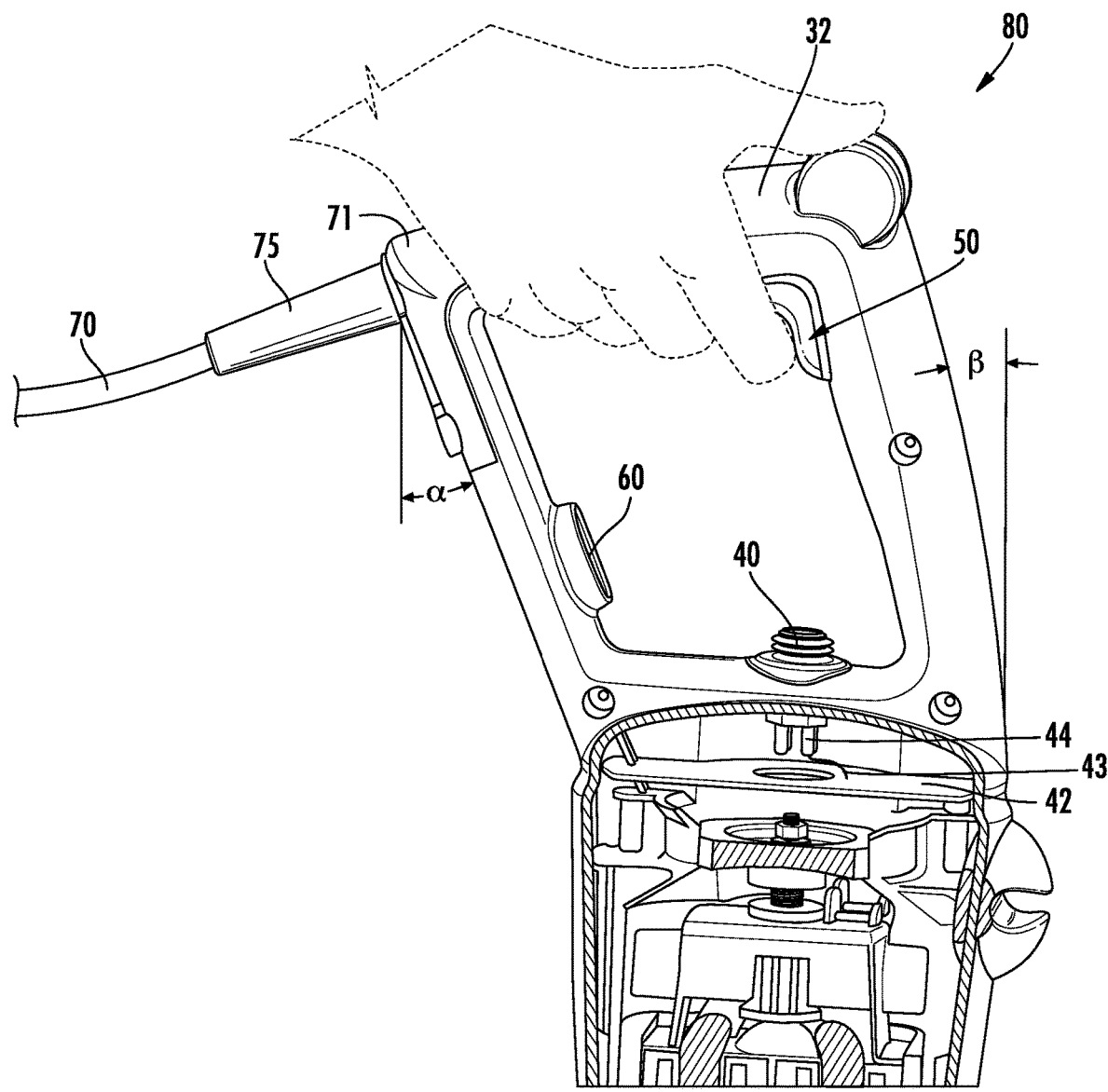
FIG. 10 is a side partial section view of the mixer of FIG. 1 with a user's hand grasping the horizontal segment of the handle.

Referring now to FIGS. 1, 2 and 8, a power cord 70 is mounted to the upper rear portion of the rear segment 34 of the handle 30. The power cord 70 is mounted to an L-shaped cover 71 that is attached to the rear segment 34 via a single screw 72 inserted into a hole 34a in the rear segment 34. A flexible strip 74 is attached to an overmolded boot 75 on the power cord 70; the strip 74 includes a plug 76 at one end that is configured to fit within the hole 34a. Within the handle 30, the power cord 70 is mounted with a fitting 78 (held in place with screws 79) and connected with one or more connectors 77. Wiring 92a is routed from the connectors 77 to a terminal 46 of the power button 40, and wiring 92b is routed from the connector(s) 77 to the PCB 42 (see FIG. 11).

The illustrated and above-described arrangement of the power cord 70 can facilitate replacement of the power cord 70. It has been discovered that a large percentage of failures in immersion mixers are due to power cord issues. Such failures typically require replacement of the entire mixer or significant service effort to remove the power cord and rewire the new cord. In contrast, should the power cord 70 fail, the cover 71 can be removed by unplugging the plug 76 from the hole 34a and removing the single screw 72. The power cord 70 can then be disconnected from the connectors 77 and, after removing the screws 79 from the fitting 78, the power cord 70 can be removed. Replacement of the power cord 70 requires only the reconnection of the connectors 77 to the new power cord 70, reattachment of the new power cord 70 to the fitting 78 with the screws 79, reattachment of the cover 71 with the screw 72, and insertion of the plug 76 of the new power cord 70 into the hole 34a.

As discussed above, regulations require that the immersion mixer 10 be designed such that the motor 20 begins to rotate the shaft 16 and blades 18 only when (a) the power button 40 is activated and (b) the interlock button 60 and the trigger 50 are both depressed. Compliance with these requirements is controlled by the PCB 42, which includes logic circuitry that enables activation of the motor 20 only under the proper conditions. The design and operation of the circuitry of the PCB 42 carrying out this control function will be understood by those of skill in this art and need not be described in detail herein. In some embodiments, once the interlock button 60 has been depressed for a minimum duration (e.g., two seconds), the user can release the interlock button 60 and the motor 20 continues to rotate the blades 18 as long as the trigger 50 remains depressed, thereby freeing up one of the user's hands to grasp another portion of the mixer 10 (often the grip 13).

Notably, the L-shaped configuration of the trigger 50 enables a user to depress the trigger 50 from either of two different handhold positions. First, a user may heft the mixer 10 by placing one hand on the horizontal segment 32 of the handle 30, with the thumb facing forwardly and the fingers curled under the horizontal segment 32 (typically the user's other hand would be placed on the grip 13). In this position, the user can use his forefinger to squeeze the horizontal leg 51 of the trigger 50 to maintain the motor 20 in an operational state. Second, a user may heft the mixer 10 by placing one hand on the front segment 36 of the handle 30, with the thumb extending upwardly and the fingers curled around the rear side of the front segment 36 (again, typically the user's other hand would be placed on the grip 13). In this position, the user can use his forefinger to squeeze the vertical leg 52 of the trigger 50 to maintain the motor 20 in an operational state.

Figure 4:
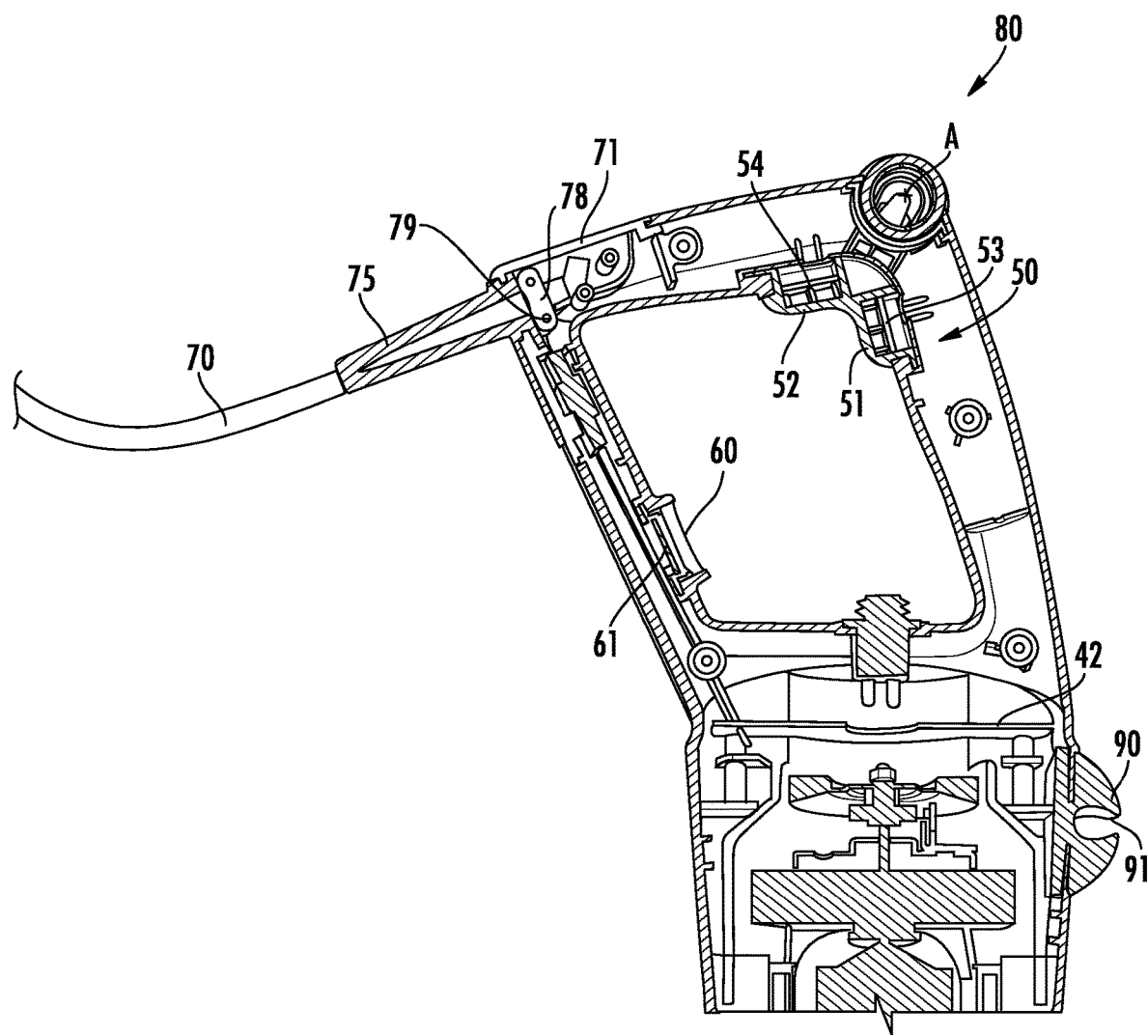
FIG. 4 is an enlarged partial side section view of the housing and handle of FIG. 2.
Figure 5:
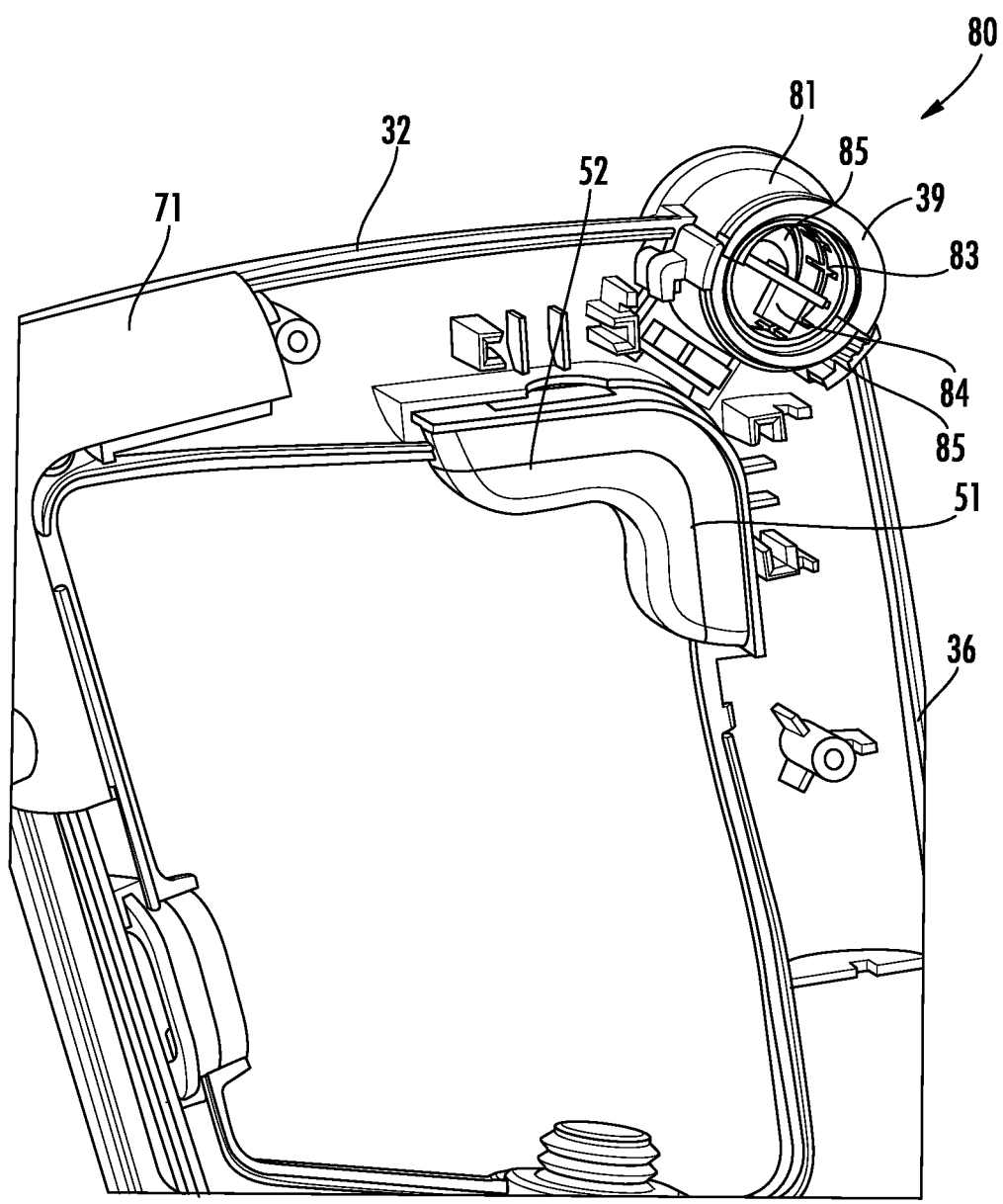
FIG. 5 is a greatly enlarged, partial section view of the handle of FIG. 2.
Figure 6:
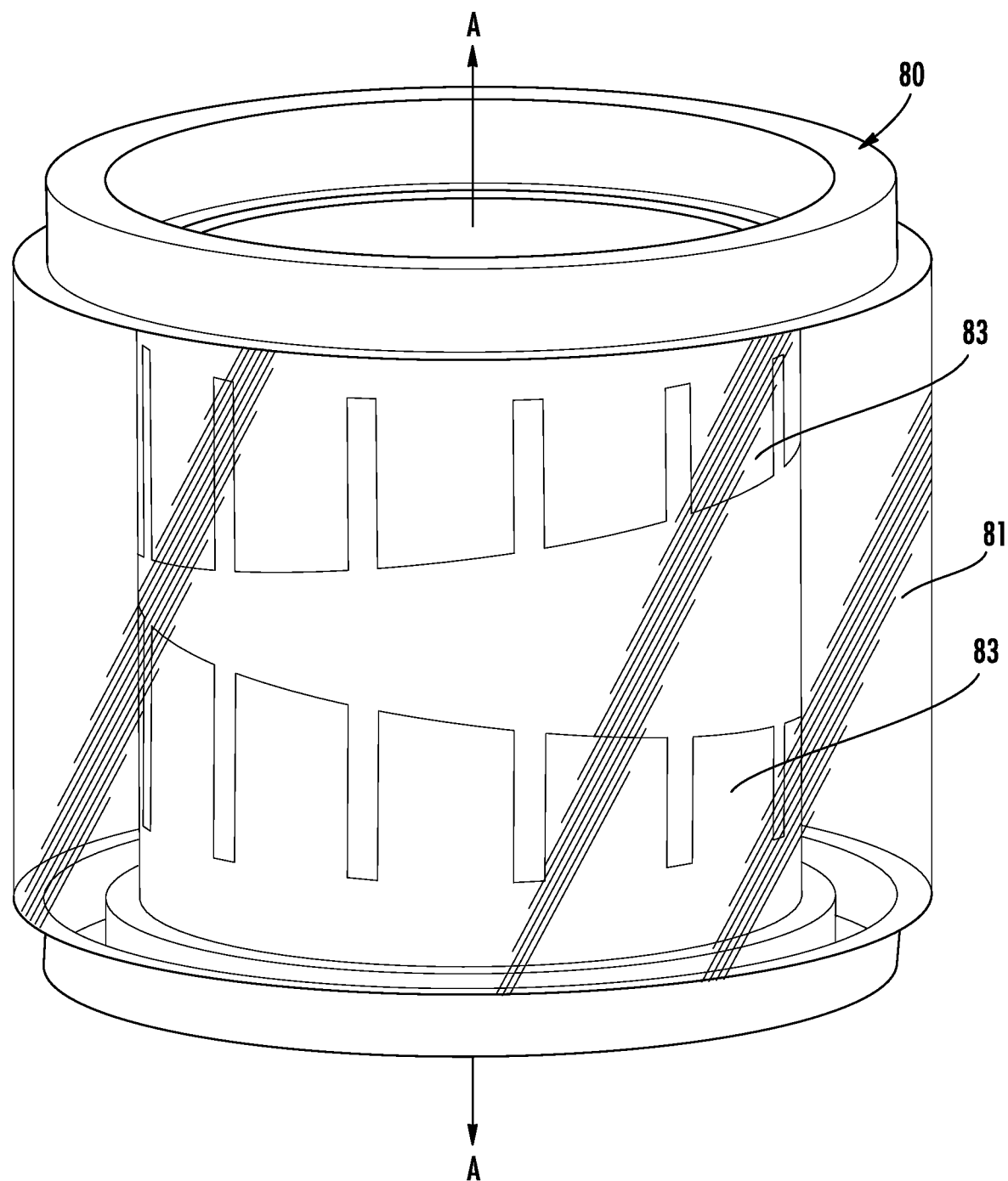
FIG. 6 is a perspective view of the drive speed dial of the immersion mixer of FIG. 1 with the engagement cylinder shown as transparent.
Figure 7:
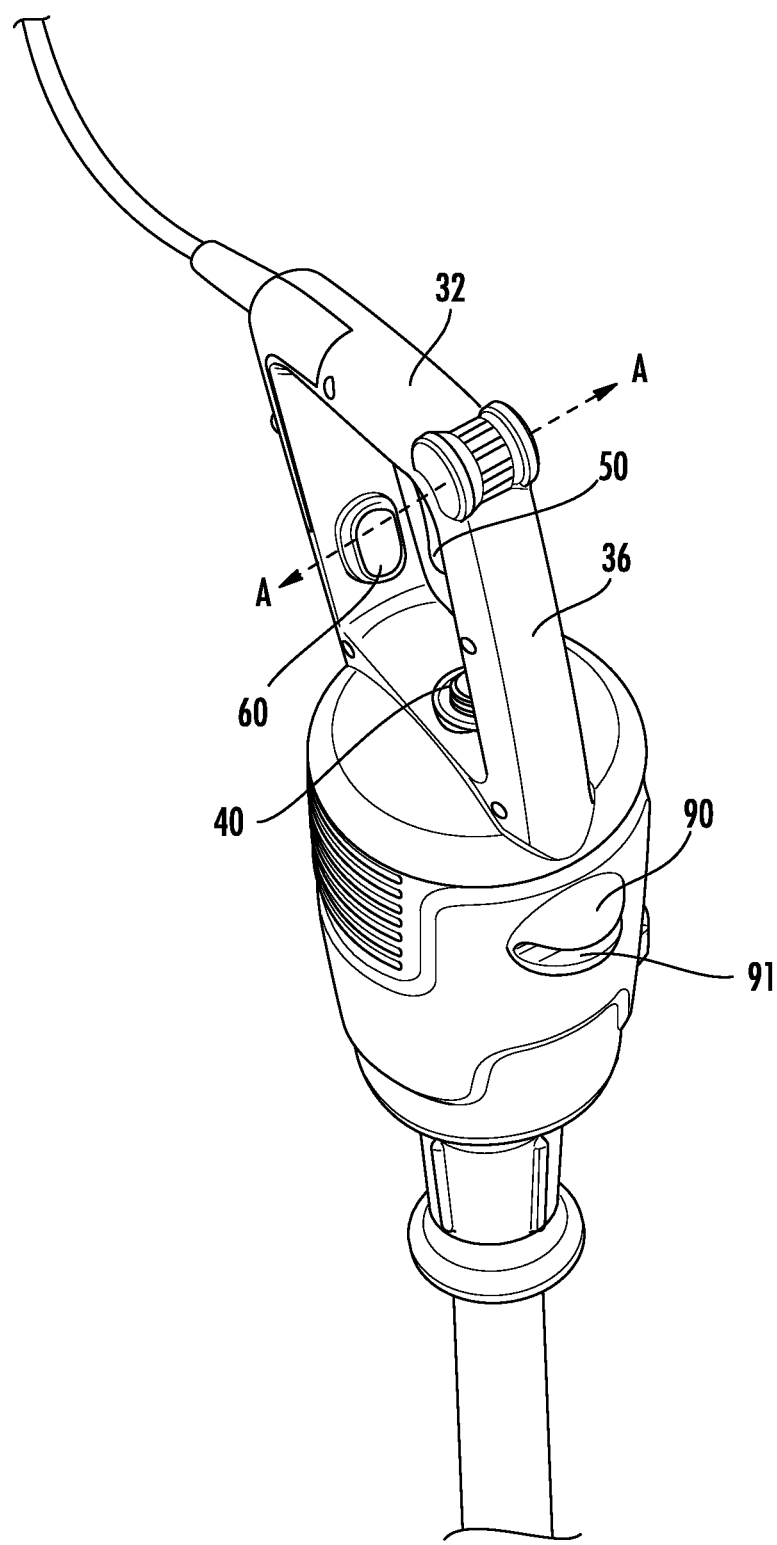
FIG. 7 is an enlarged partial perspective view of the housing and handle of FIG. 2.

Referring now to FIGS. 4 and 5, a drive speed dial 80 is mounted adjacent the junction or vertex of the forward and horizontal segments 36, 32 of the handle 30. The drive speed dial 80 includes a translucent/transparent cylindrical indicator sleeve 81. The indicator sleeve 82 may be frosted or otherwise treated to enhance the desired lighting effect. Opaque markings 83 (shown herein as a series of fingers gradually increasing in length as they extend from the ends of the sleeve 82) are affixed to the inner surface of the sleeve 81. An LED 84 (which may be multicolored) is mounted within the sleeve 81 at one end. A potentiometer 85 is mounted to the opposite end of the sleeve 82 and is electrically connected with the PCB 42 via wiring 88 and to the LED 84 via wiring 87 (see FIG. 11). The sleeve 81 is mounted within a boss 39 in the handle 30 and can rotate therein about an axis A that is parallel with the longitudinal axes of the sleeve 81 and generally normal to the front segment 36 and horizontal segment 32.

Rotation of the drive speed dial 80 causes the potentiometer 85 to signal the motor 20 (through the wiring 88 and the PCB 42) to adjust its speed. Light from the LED 84 illuminates the sleeve 81. The markings 83 block the light from the LED 84, and are arranged to indicate to the user the relative speed of the motor 20 (e.g., more light seen by the user due to less blockage from shorter markings 83 may indicate a higher motor speed, and vice versa for less light due to more blockage).

It should be noted that the position and operation of the drive speed dial 80 facilitates handling of the mixer 10. More specifically, the location of the drive speed dial 80 enables a user to easily reach and manipulate the drive speed dial 80 with his thumb to adjust the speed. This easy access to the drive speed dial 80 is available whether the user grasps the mixer 10 by the front segment 36 of the handle 30 or by the horizontal segment 32; in either event, the user's thumb is positioned adjacent the drive speed dial 80 and can be used to adjust the drive speed dial 80.

Also, in some embodiments, the employment of a multicolor LED 84 can allow the drive speed dial 80 to provide information on operating conditions via different colors. For example, green may indicate normal operation, red may indicate overheating, blue may indicate continuous operation, etc. Alternatively, or in addition, the LED 84 may remain solid, blink, flash, or follow another illumination pattern or sequence (e.g. alternating shorter and longer flashes) to indicate an operational state. Other possibilities will be apparent to those of skill in this art.

In addition, a cord clip 90 is present on the front side of the housing 12, and is configured to snugly receive a section of the power cord 70 in a recess 91 therein. The cord clip 90 can serve as a location to secure the power cord 70 when the mixer 10 is not in use; the power cord 70 can be wrapped around the housing 12, with the last "wrap" of the cord 70 being inserted into the recess 91 to hold the cord 70 in place.

In addition, when the mixer 10 is grasped by the user with one hand on the front segment 36, the mixer is typically oriented relative to a vessel containing ingredients to be mixed with the rear of the mixer 10 facing the vessel. As such, in this orientation the power cord 70 is facing away from the user, and may be at risk of dangling in the vessel, where it might undesirably engage with the food in the vessel or be struck by one of the blades 18. To prevent this, the user can bend the power cord 70 forwardly and insert it into the recess 91 of the clip 90, thereby maintaining the power cord 70 out of the way of the mixing operation.

Those of skill in this art will appreciate that the mixer 10 may take other forms. For example, the handle 30 may have more or fewer segments. As one example, the rear segment may be omitted, such that the mixer has an L-shaped or inverted V-shaped handle that includes a dual-segmented trigger. The segments of the handle may be disposed at different angles relative to the shaft and/or to each other. One or more of the segments of the handle may be arcuate. Other variations will be apparent to the ordinarily skilled artisan.

In addition, the trigger 50 may employ different means of signaling the motor 20 to rotate the shaft 16. As examples, the capacitive switches 53, 54 may be replaced with spring-loaded pressure switches, other displacement switches, or the like.

In further embodiments, the power button 40 and/or the interlock button 60 may be positioned differently. For example, both may be located on the upper surface of the housing 12, both may be on one of the segments of the handle 30, or their positions may be reversed (i.e., the power button located on the handle and the interlock switch located on the housing).

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:
1. An immersion mixer, comprising:
 a housing;
 a drive motor residing within the housing;
 a shaft attached to the motor and configured to rotate relative to the housing;
 blades attached to and rotatable with the shaft;
 a U-shaped handle attached to the housing, the handle including a first handle segment, a second handle segment, and a third handle segment, the second and third handle segments attached to the first segment and to the housing;
 a L-shaped trigger attached to the handle and operatively associated with the motor, the trigger including a first trigger segment that is generally parallel with the first handle segment and a second trigger segment that is generally parallel with the second handle segment;

wherein engagement by a user of either the first segment of the trigger or the second segment of the trigger causes the drive motor to rotate the shaft and blades.

2. The immersion mixer defined in claim 1, wherein the second and third handle segments are generally vertical segments relative to the housing.

3. The immersion mixer defined in claim 2, further comprising an interlock button operatively associated with the drive motor, wherein initial rotation of the shaft by the motor requires engagement of the interlock button and the trigger.

4. The immersion mixer defined in claim 3, wherein the interlock button is mounted on the third handle segment.

5. The immersion mixer defined in claim 1, further comprising a first capacitive switch operatively associated with the first trigger segment and a second capacitive switch operatively associated with the second trigger segment.

6. The immersion mixer defined in claim 1, further comprising a power button mounted on an upper surface of the housing.

7. The immersion mixer defined in claim 1, further comprising a drive speed dial mounted adjacent a vertex between the first and second handle segments.

8. The immersion mixer defined in claim 7, wherein the drive speed dial is configured to rotate about an axis that is generally normal to the first and second handle segments of the handle.

9. The immersion mixer defined in claim 1, wherein the second handle segment is disposed at an angle of between about 45 and 90 degrees relative to the shaft.

10. An immersion mixer, comprising:
a housing;
a drive motor residing within the housing;
a shaft attached to the motor and configured to rotate relative to the housing;
blades attached to and rotatable with the shaft;
a handle attached to the housing, the handle comprising a first generally horizontal handle segment and second and third generally vertical handle segments attached to the first segment and to the housing, and the handle including a detachable L-shaped cover, wherein the cover spans a portion of the first horizontal segment and a portion of one of the second and third vertical segments;
a trigger attached to the handle and operatively associated with the motor; and
a power cord electrically connected with the motor, the power cord mounted through the cover of the handle.

11. The immersion mixer defined in claim 10, wherein the power cord is electrically connected with the motor via connectors configured to enable the power cord to be detached from and reattached to the motor.

12. The immersion mixer defined in claim 11, wherein the cover is attached to the handle via a single reusable fastener.

13. The immersion mixer defined in claim 12, wherein the connectors reside within the handle.

14. The immersion mixer defined in claim 10, wherein the trigger is L-shaped and includes a first trigger segment that is generally parallel with the first handle segment and a second trigger segment that is generally parallel with the second handle segment.

15. The immersion mixer defined in claim 14, further comprising a cord clip mounted to the second segment.

* * * * *